United States Patent
Akebono et al.

(10) Patent No.: US 11,326,691 B2
(45) Date of Patent: May 10, 2022

(54) BELT-TYPE CONTINUOUSLY VARIABLE TRANSMISSION

(71) Applicants: JATCO Ltd, Fuji (JP); NISSAN MOTOR CO., LTD., Yokohama (JP)

(72) Inventors: Hiromichi Akebono, Kawasaki (JP); Shohei Imaji, Zama (JP); Seiichirou Takahashi, Isehara (JP); Katsuyuki Hara, Isehara (JP)

(73) Assignees: JATCO LTD, Shizuoka (JP); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 17/274,050

(22) PCT Filed: Aug. 6, 2019

(86) PCT No.: PCT/JP2019/030853
§ 371 (c)(1),
(2) Date: Mar. 5, 2021

(87) PCT Pub. No.: WO2020/059339
PCT Pub. Date: Mar. 26, 2020

(65) Prior Publication Data
US 2021/0254711 A1     Aug. 19, 2021

(30) Foreign Application Priority Data

Sep. 21, 2018   (JP) .............................. JP2018-176826

(51) Int. Cl.
*F16H 61/662*        (2006.01)
*F16H 59/26*         (2006.01)
(Continued)

(52) U.S. Cl.
CPC ....... *F16H 61/66236* (2013.01); *F16H 59/26* (2013.01); *F16H 59/44* (2013.01);
(Continued)

(58) Field of Classification Search
CPC .......... F16H 59/26; F16H 59/44; F16H 59/54; F16H 59/70; F16H 59/48;
(Continued)

(56) References Cited

U.S. PATENT DOCUMENTS 6,623,388 B1   9/2003   Senger
8,565,985 B2 *  10/2013  Nakagawa ............ E02F 9/2253
                                                           701/50
(Continued)

FOREIGN PATENT DOCUMENTS

JP   2001-330145 A   11/2001
JP   2002-533628 A   10/2002
(Continued)

*Primary Examiner* — Edwin A Young
(74) *Attorney, Agent, or Firm* — Foley & Lardner LLP

(57) ABSTRACT

A belt-type continuously variable transmission includes a primary pulley, a secondary pulley, and a belt wound around the primary pulley and the secondary pulley. A controller performs a process, when performing a low speed position return shift to shift a transmission ratio toward a lowermost speed position while a vehicle is decelerating. The process includes: calculating a primary pressure actual lower limit, at which the belt actually starts to slip, based on the transmission ratio and a deceleration of the vehicle; setting a lower limit of a setpoint of the primary pressure to the primary pressure actual lower limit; setting the primary pressure actual lower limit higher with a locking tendency of a vehicle wheel detected than that without the locking tendency detected; and setting the primary pressure actual lower limit with the locking tendency detected to increase as the transmission ratio varies toward the lowermost speed position.

8 Claims, 6 Drawing Sheets

(51) Int. Cl.
  *F16H 59/44*   (2006.01)
  *F16H 59/54*   (2006.01)
  *F16H 59/70*   (2006.01)

(52) U.S. Cl.
  CPC ............. *F16H 59/54* (2013.01); *F16H 59/70* (2013.01); *F16H 2059/704* (2013.01)

(58) Field of Classification Search
  CPC ......... F16H 2059/704; F16H 2059/506; F16H 61/66236; F16H 2061/6605; F16H 2312/18
  See application file for complete search history.

(56) References Cited

U.S. PATENT DOCUMENTS

| | | | |
|---|---|---|---|
| 10,527,161 B2* | 1/2020 | Kawamoto | ............ F16H 61/662 |
| 2001/0002452 A1* | 5/2001 | Bacher | .................. B60W 30/18 |
| | | | 701/67 |
| 2001/0049574 A1 | 12/2001 | Taniguchi | |
| 2015/0081181 A1 | 3/2015 | Takahashi | |
| 2017/0030463 A1* | 2/2017 | Takemori | .......... F16H 61/66272 |

FOREIGN PATENT DOCUMENTS

| | | |
|---|---|---|
| JP | 2002-327835 A | 11/2002 |
| WO | WO-2013/145974 A1 | 10/2013 |

* cited by examiner

BELT-TYPE CONTINUOUSLY VARIABLE TRANSMISSION

TECHNICAL FIELD

The present invention relates to a belt-type continuously variable transmission structured to continuously vary a transmission ratio at which a belt transmits driving power between pulleys.

BACKGROUND ART

Conventionally, Patent Document 1 discloses a technique regarding a transmission shift pressure control for a belt-type continuously variable transmission, in which belt slipping is prevented by increasing a primary pressure when rotational speed of a primary pulley is lower than or equal to a predetermined value, vehicle speed is lower than or equal to a predetermined value, and deceleration of a vehicle is greater than or equal to a predetermined value.

However, for example, on a low μ road, even with no such great deceleration, belt slipping may occur when a tire is caused by braking to show a locking tendency.

The present invention has been made in view of the foregoing problem, and it is an object of the present invention to provide a belt-type continuously variable transmission capable of suppressing belt slipping even when a tire shows a locking tendency.

PRIOR ART DOCUMENT(S)

Patent Document(s)

Patent Document 1: JP 2002-327835 A

SUMMARY OF INVENTION

In order to achieve the object described above, according to the present invention, a belt-type continuously variable transmission includes: a primary pulley to which a primary pressure is supplied; a secondary pulley to which a secondary pressure is supplied; a belt wound around the primary pulley and the secondary pulley, wherein a pulley pressing force is determined by the primary pressure and the secondary pressure; and a transmission shift controller configured to perform a process, when performing a low speed position return shift to shift a transmission ratio of the belt-type continuously variable transmission toward a lowermost speed position while a vehicle is decelerating, wherein the process includes: calculating a primary pressure actual lower limit, at which the belt actually starts to slip, based on the transmission ratio and a deceleration of the vehicle; setting a lower limit of a setpoint of the primary pressure to the primary pressure actual lower limit; and setting the primary pressure actual lower limit higher with a locking tendency of a vehicle wheel detected than that without the locking tendency detected.

Accordingly, even if a tire shows a locking tendency, the feature that the lower limit of the setpoint of the primary pressure is set higher than that when the tire has no tendency to lock, serves to suppress belt slipping.

MODE(S) FOR CARRYING OUT INVENTION

Figure 1:
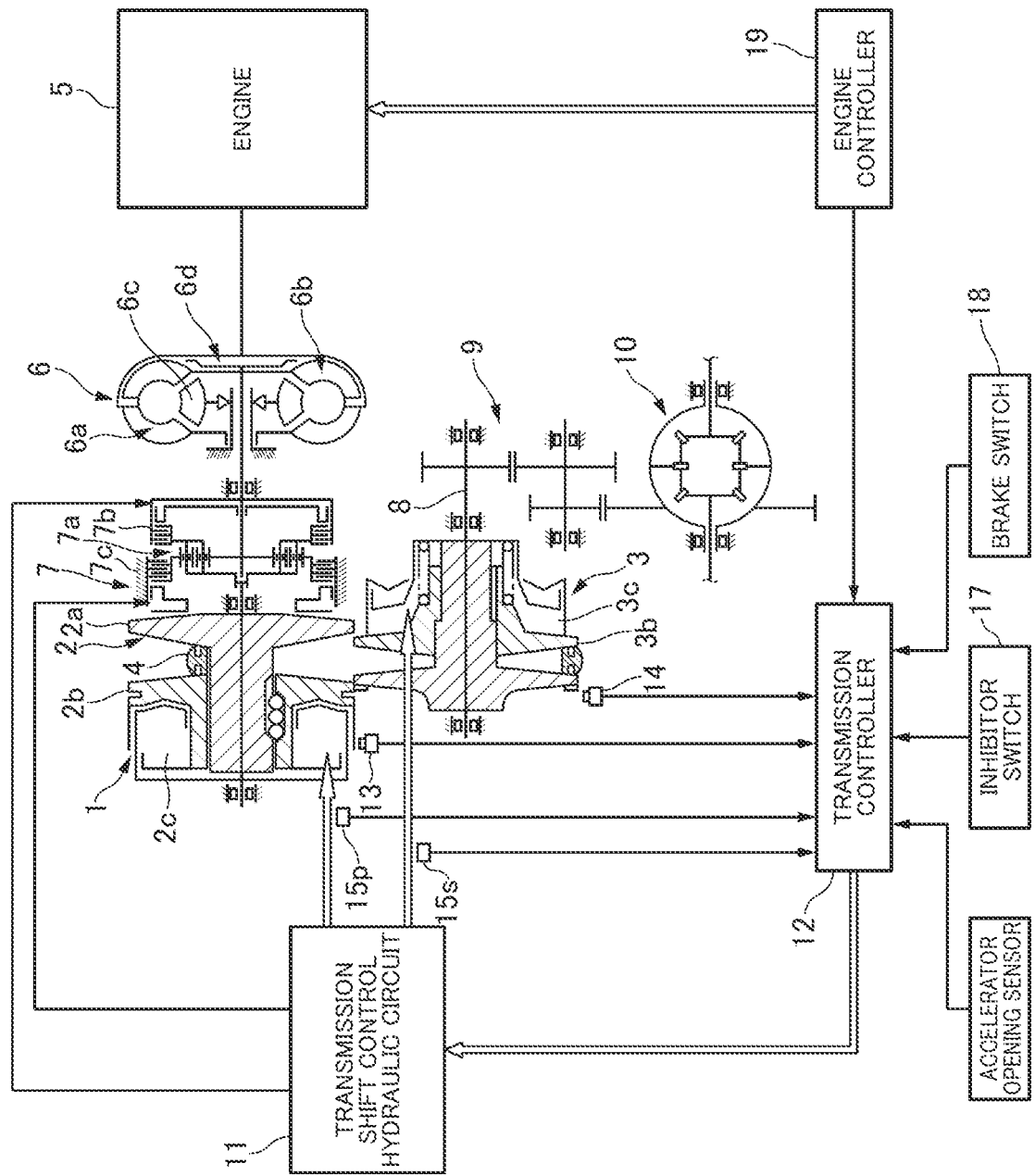
FIG. 1 is a diagram schematically showing configuration of a continuously variable transmission according to a first embodiment.

<First Embodiment> FIG. 1 is a diagram schematically showing configuration of a continuously variable transmission (henceforth referred to as CVT) 1 according to a first embodiment. A primary pulley 2 and a secondary pulley 3 are arranged with their grooves aligned. A belt 4 is wound around the grooves of the pulleys 2, 3. An engine 5 is arranged coaxially with the primary pulley 2. Between the engine 5 and the primary pulley 2, a torque converter 6 and a forward-backward drive switch mechanism 7 are provided in this order from the engine 5.

The torque converter 6 includes: a pump impeller 6a connected to an output shaft of the engine 5; a turbine runner 6b connected to an input shaft of the forward-backward drive switch mechanism 7; a stator 6c; and a lockup clutch 6d.

The forward-backward drive switch mechanism 7 includes a double-pinion planetary gearset 7a as a main component, which includes a sun gear coupled with the turbine runner 6b of the torque converter 6, and a carrier coupled with the primary pulley 2. The forward-backward drive switch mechanism 7 further includes: a start clutch 7b structured to establish direct connection between the sun gear and the carrier of the double-pinion planetary gearset 7a; and a reverse brake 7c structured to fix a ring gear of the double-pinion planetary gearset 7a. When the start clutch 7b is engaged, input rotation from the engine 5 via the torque converter 6 is directly transmitted to the primary pulley 2. When the reverse brake 7c is engaged, the input rotation from the engine 5 via the torque converter 6 is reversed, and transmitted to the primary pulley 2.

Rotation of the primary pulley 2 is transmitted to the secondary pulley 3 via the belt 4. Rotation of the secondary pulley 3 is transmitted to driving wheels not shown via an output shaft 8, a gearset 9, and a differential gear unit 10. In order to allow a transmission ratio between the primary pulley 2 and the secondary pulley 3 to be varied during driving power transmission described above, the groove of the primary pulley 2 and the groove of the secondary pulley 3 are each formed by two conical plates, one of which is a fixed conical plate 2a, 3a, and the other of which is a movable conical plate 2b, 3b structured to move in an axial direction. The movable conical plates 2b, 3b are pressed toward the fixed conical plates 2a, 3a by supplying a primary pressure Ppri and a secondary pressure Psec to a primary pulley chamber 2c and a secondary pulley chamber 3c, respectively, wherein the primary pressure Ppri and the secondary pressure Psec are produced from a line pressure as an original pressure, so that the belt 4 is frictionally engaged with the conical plates to transmit driving power between the primary pulley 2 and the secondary pulley 3.

Transmission shifting is implemented by varying the grooves of the pulleys 2, 3 in width by a differential pressure between the primary pressure Ppri and the secondary pressure Psec, so as to continuously vary winding arc diameters of the belt 4 with respect to the pulleys 2, 3.

The primary pressure Ppri and the secondary pressure Psec are controlled by a transmission shift control hydraulic circuit 11, as well as a hydraulic pressure supplied to the start clutch 7b that is engaged when a forward drive range is selected, and a hydraulic pressure supplied to the reverse brake 7c that is engaged when a reverse drive range is selected. The transmission shift control hydraulic circuit 11 performs the control in response to a signal from the transmission controller 12.

The transmission controller 12 is configured to receive input of: a signal from an input rotational speed sensor 13 for sensing an actual input rotational speed Nin of the CVT 1; a signal from a vehicle speed sensor 14 for sensing an output rotational speed of the CVT 1, i.e. a vehicle speed VSP; a signal from a primary pressure sensor 15p for sensing the primary pressure Ppri; a signal from a secondary pressure sensor 15s for sensing the secondary pressure Psec; a signal from an accelerator opening sensor 16 for sensing an accelerator opening APO; a selected range signal from an inhibitor switch 17 for sensing a select lever position; a signal from a brake switch 18 for sensing whether or not a brake pedal is depressed; and a signal regarding an operating state (engine rotational speed Ne, engine torque, fuel injection duration, cooling water temperature TMPe, etc.) of the engine 5 from an engine controller 19 for controlling the engine 5.

Figure 2:
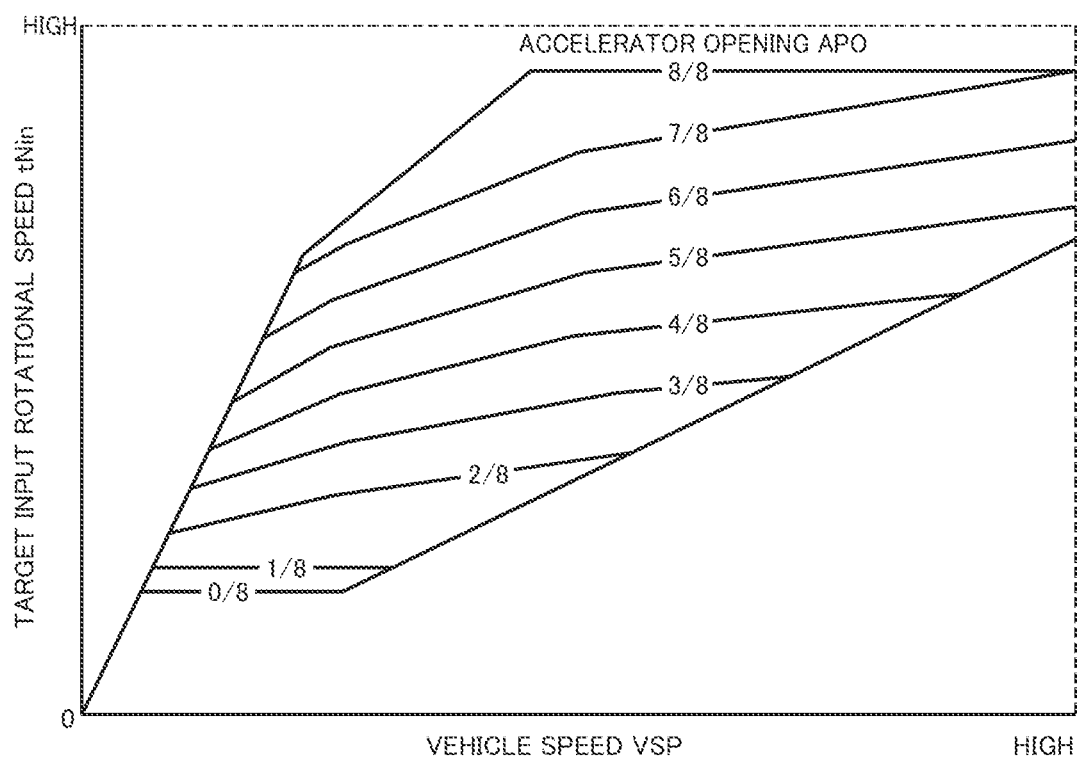
FIG. 2 is a transmission shift map according to the first embodiment.

The transmission controller 12 sets a target input rotational speed tNin in accordance with the vehicle speed VSP and the accelerator opening APO, with reference to a transmission shift map shown in FIG. 2, and controls the primary pressure Ppri and the secondary pressure Psec so as to cause the actual input rotational speed Nin to follow the target input rotational speed tNin, and obtain a pulley pressing force required to transmit an input torque of the CVT 1 that is determined by the engine torque and torque converter torque ratio.

For each of the primary pressure Ppri and the secondary pressure Psec, a lower limit is set and calculated by the following equation (henceforth referred to as theoretical lower limit), and the primary pressure Ppri and the secondary pressure Psec are normally limited so as not to be lower than the theoretical lower limit.

Theoretical Lower Limit=$(T \cos \theta)/(2\mu R)$ where
T: transmitted torque,
θ: pulley sheave angle,
μ: friction coefficient between belt and pulley, and
R: radius of contact between belt and pulley.

When one of the pressures is limited to the theoretical lower limit, the other pressure is increased so as to ensure a differential thrust between the primary pulley 2 and the secondary pulley 3 which is required for transmission shifting.

When an accelerator is released and the brake pedal is depressed, or when the vehicle is climbing a slope or so and decelerating, the low speed position return shift is performed so that the CVT 1 downshifts toward the lowermost speed position along a line of APO=0/8 in FIG. 2. Under this condition, the primary pressure Ppri may be lowered below the theoretical lower limit, except for a condition immediately before the vehicle is stopped and a transmission steady-state condition (the lowermost speed position) where the transmission ratio does not change, under which conditions belt slipping is to be suppressed which may occur due to lowering of the primary pressure below the primary pressure theoretical lower limit.

Therefore, the transmission controller 12 is configured to perform a hydraulic pressure reduction control during the low speed position return shift as described below, so as to lower the primary pressure Ppri below the theoretical lower limit, and thereby improve low speed position return performance of the vehicle on which the CVT1 is mounted, and further improve fuel efficiency by downsizing of an oil pump.

Figure 3:
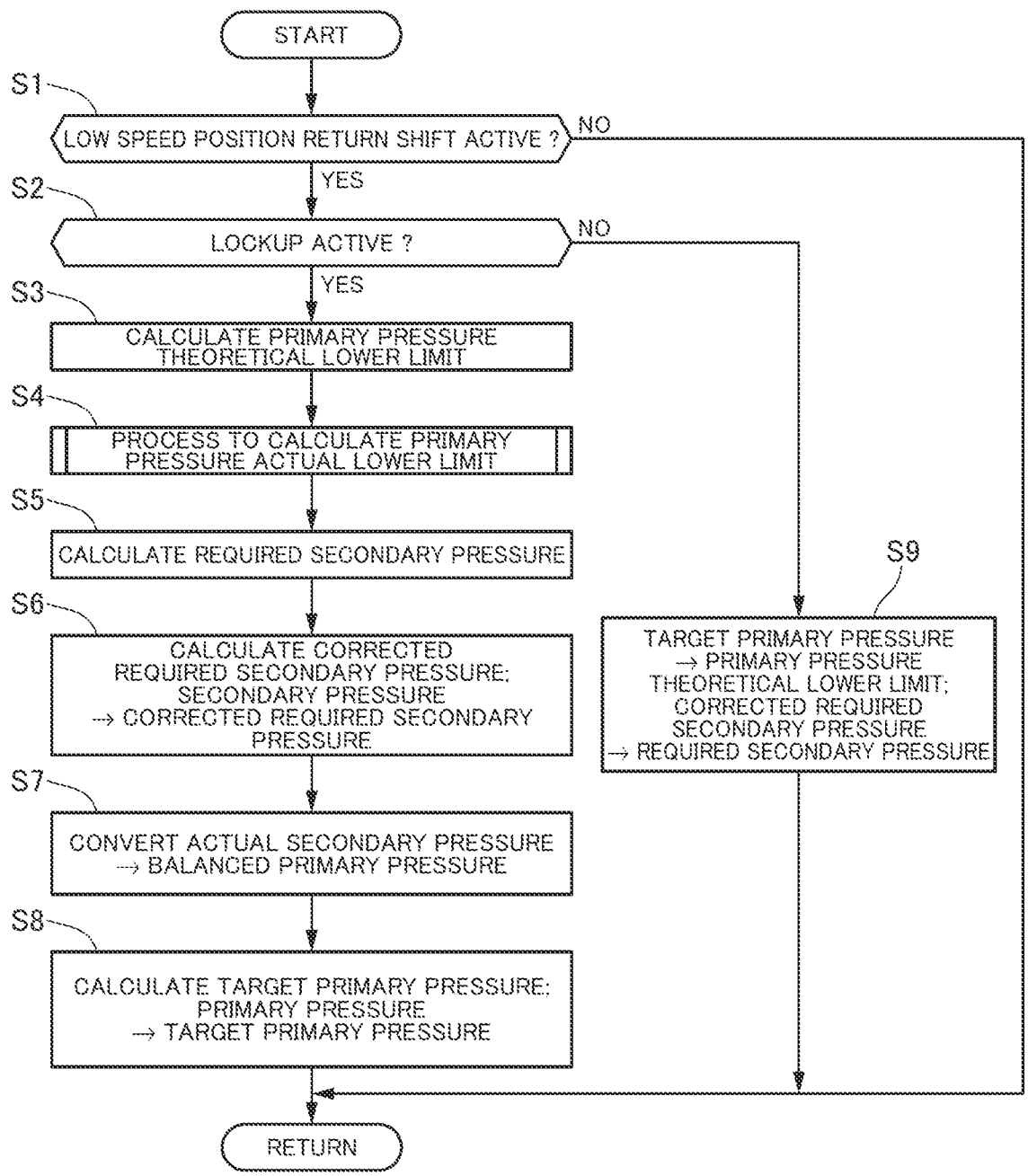
FIG. 3 is a flowchart showing contents of a hydraulic pressure reduction control during a low speed position return shift, which is performed by a transmission controller 12 according to the first embodiment.
Figure 6:
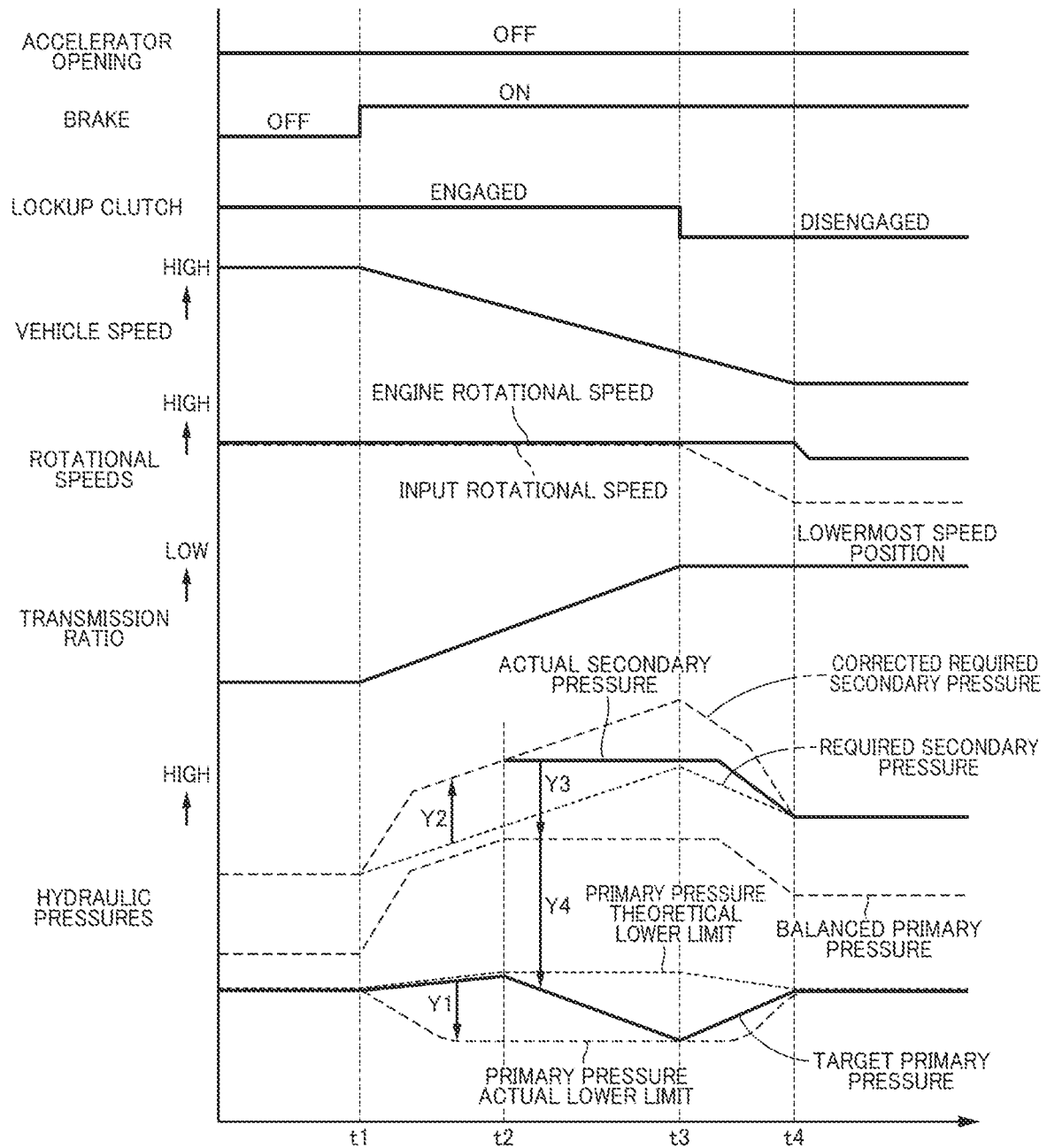
FIG. 6 is a time chart showing behavior under the hydraulic pressure reduction control during the low speed position return shift according to the first embodiment.

FIG. 3 is a flowchart showing contents of the hydraulic pressure reduction control during the low speed position return shift, which is performed by the transmission controller 12 according to the first embodiment. The following describes the contents of this control and its actions and effects with reference to the flowchart. The following explanation refers to a time chart shown in FIG. 6 as appropriate. The time chart of FIG. 6 shows behavior under the hydraulic pressure reduction control during the low speed position return shift.

At Step S1, the transmission controller 12 determines whether or not the low speed position return shift is active. When the accelerator opening is zero and the brake pedal is depressed, or when the accelerator opening is zero and the deceleration of the vehicle is greater than a predetermined value (when climbing a slope), the transmission controller 12 then determines that the low speed position return shift is active, and then proceeds to Step S2. Otherwise, the process ends.

At Step S2, the transmission controller 12 determines whether or not lockup is active. The lockup clutch 6d is engaged when the vehicle speed VSP gets higher than a predetermined lockup start vehicle speed, and is disengaged when the vehicle speed VSP gets lower than a predetermined lockup release vehicle speed (less than the lockup start vehicle speed). Therefore, it can be determined based on the vehicle speed VSP whether or not the lockup is active. When determining that the lockup is active, the process proceeds to Step S3 and the following, in order to lower the primary pressure Ppri below the primary pressure theoretical lower limit. When determining that the lockup is inactive, the process proceeds to Step S9, in order to return the primary pressure Ppri, which has been reduced below the primary pressure theoretical lower limit through Step S3 and the following, to the primary pressure theoretical lower limit. In FIG. 6, at a time instant t1, the brake pedal is depressed, and the low speed position return shift is started.

At Step S3, the transmission controller 12 calculates the primary pressure theoretical lower limit. As described above, the primary pressure theoretical lower limit is calculated based on the transmitted torque (i.e. the torque of the engine 5 calculated based on the engine rotation speed Ne and the accelerator opening APO with reference to the engine torque map), and the sheave angle of the primary pulley 2 (fixed value), the coefficient of friction between the belt 4 and the primary pulley 2 (fixed value), and the radius of contact between the belt 4 and the primary pulley 2 (determined by the transmission ratio).

At Step S4, the transmission controller 12 performs a process to calculate the primary pressure actual lower limit. The primary pressure actual lower limit is a value of the primary pressure Ppri at which the belt 4 actually starts to slip, and is calculated based on the deceleration of the vehicle and the transmission ratio with reference to a map determined experimentally in advance. When an anti-lock brake control system (henceforth referred to as ABS) for preventing vehicle wheel locking is inactive, the primary pressure actual lower limit is set to decrease as the deceleration of the vehicle increases, and decrease as the transmission ratio varies toward the lowermost speed position. When the deceleration is large, it is required to shift toward the lowermost speed position more quickly, which requires a large differential thrust. Therefore, the primary pressure actual lower limit is set to a low value in order to ensure a differential pressure between the primary pressure and the secondary pressure. Furthermore, when the transmission ratio is closer to the lowermost speed position, the required primary pressure is low, so that by setting the primary pressure actual lower limit to a low value, it is possible to reduce the required secondary pressure, downsize the oil pump, and improve the fuel efficiency.

On the other hand, when the ABS is active, the transmission ratio is set to increase toward the lowermost speed position, regardless of the deceleration. Under this condition, a second primary pressure actual lower limit is set higher than the theoretical lower limit, wherein the second primary pressure actual lower limit is a primary pressure actual lower limit set when the ABS is active. The process to calculate the primary pressure actual lower limit is described in detail below.

Figure 4:
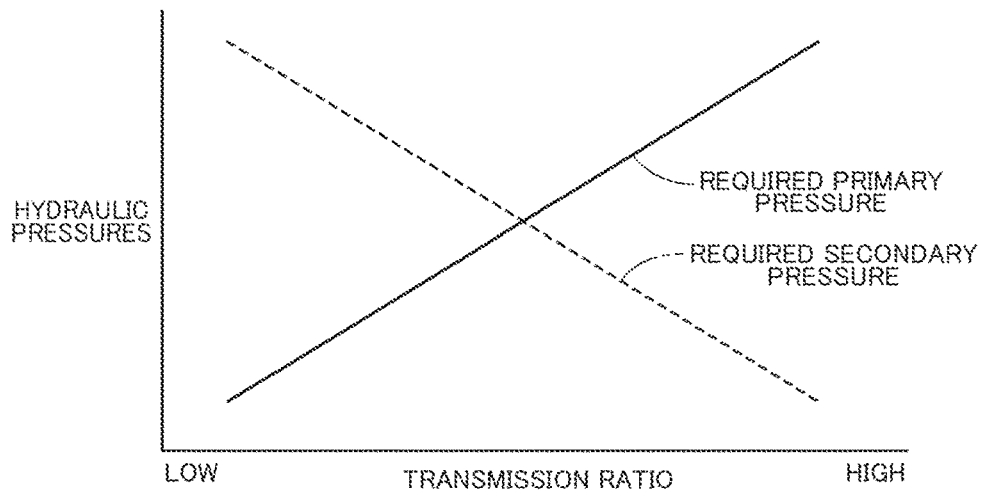
FIG. 4 is a map showing a relationship between a transmission ratio and required pressures, which is employed for a hydraulic pressure control according to the first embodiment.

At Step S5, the transmission controller 12 calculates a value of the secondary pressure Psec required to maintain the current transmission ratio with reference to a table shown in FIG. 4. FIG. 4 also shows a required primary pressure, but this is not used in the hydraulic pressure reduction control during the low speed position return shift.

At Step S6, the transmission controller 12 calculates a corrected required secondary pressure by adding a difference between the primary pressure theoretical lower limit and the primary pressure actual lower limit (Y1 in FIG. 6) to the required secondary pressure (Y2 in FIG. 6). Then, the transmission controller 12 controls the secondary pressure Psec so that the secondary pressure Psec conforms to the corrected required secondary pressure. Specifically, the transmission controller 12 controls a solenoid valve structured to regulate the secondary pressure Psec.

At Step S7, the transmission controller 12 senses by the secondary pressure sensor 15s the actual secondary pressure Psec produced by controlling the secondary pressure Psec at Step S6, and obtains a balanced primary pressure by conversion of this actual secondary pressure Psec and the ratio in pressure receiving area between the primary pulley 2 and the secondary pulley 3 (Y3 in FIG. 6).

At Step S8, the transmission controller 12 calculates a target primary pressure by subtracting a component corresponding to a differential thrust required for downshifting (a value obtained by dividing the required differential thrust by the pressure receiving area of the primary pulley 2) from the balanced primary pressure (Y4 in FIG. 6). The target primary pressure is lower than the primary pressure theoretical lower limit, but higher than the primary pressure actual lower limit. Therefore, the target primary pressure is not limited by the primary pressure actual lower limit. Then, the transmission controller 12 controls the primary pressure Ppri so that the primary pressure Ppri conforms to the target primary pressure. Specifically, the transmission controller 12 controls a solenoid valve structured to regulate the primary pressure Ppri.

Figure 5:
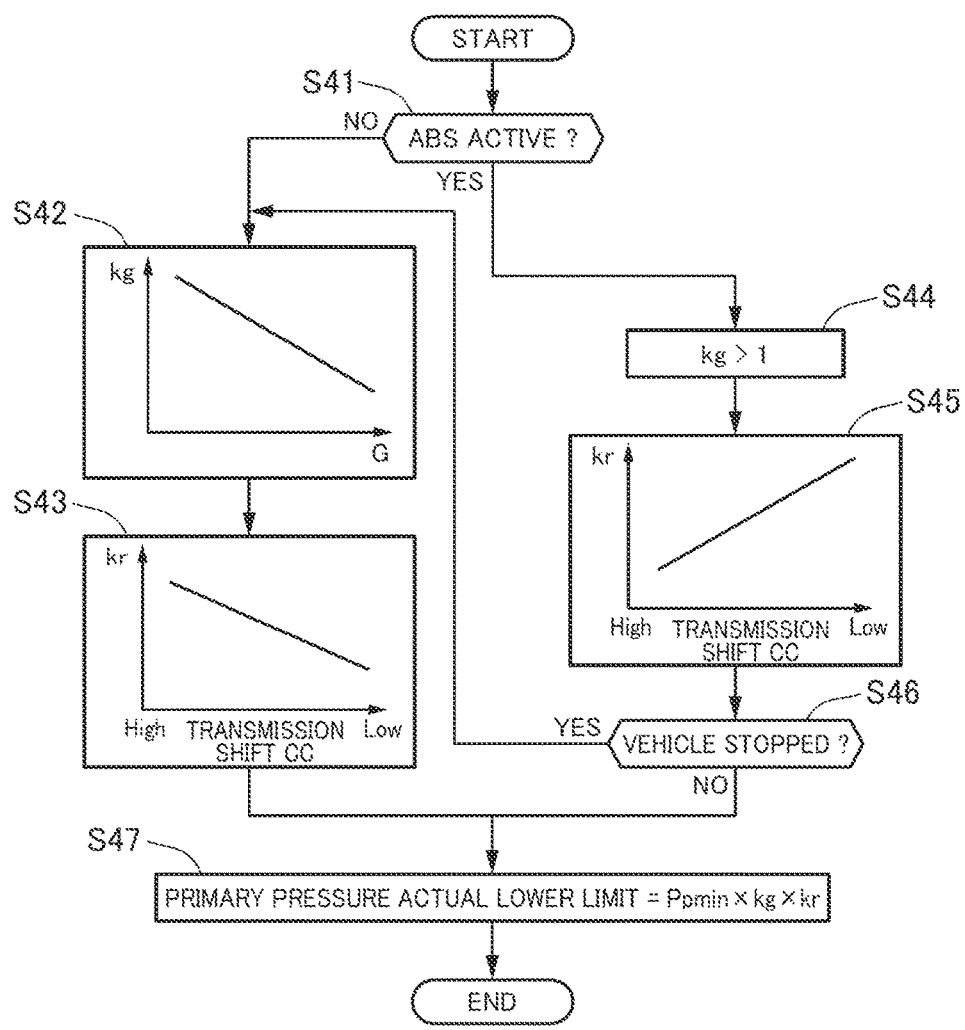
FIG. 5 is a flowchart showing a process to calculate a primary pressure actual lower limit during the low speed position return shift according to the first embodiment.

FIG. 5 is a flowchart showing the process to calculate the primary pressure actual lower limit according to the first embodiment. At Step S41, the process determines whether or not the ABS is active. When the ABS is active, the process proceeds to Step S44, and when the ABS is inactive, the process proceeds to Step S42. At Step S42, the process sets a deceleration gain kg based on the deceleration G of the vehicle. The deceleration gain kg is set to decrease as the deceleration G increases. At Step S43, the process sets a transmission ratio gain kr based on the transmission ratio. The transmission ratio gain kr is set to decrease as the transmission ratio varies toward the lowermost speed position.

At Step S44, the process sets the deceleration gain kg to 1. In other words, the deceleration gain kg is set constant with respect to the deceleration. In general, it is assumed that the ABS is active in a region where the deceleration is large. However, when the road surface friction coefficient is low, a locking tendency is likely to occur even if the deceleration is small. In other words, there is no one-to-one correspondence between the deceleration and the locking tendency. Therefore, when the ABS is active with a locking tendency, the primary pressure actual lower limit is set regardless of the deceleration, based on other parameters more closely related to the locking tendency.

At Step S45, the process sets the transmission ratio gain kr. When the ABS is active, the transmission ratio gain kr is set to increase as the transmission ratio varies toward the lowermost speed position. When a wheel is showing a locking tendency, the rotation speed of the secondary pulley 3 suddenly fluctuates, and the rotation speed of the primary pulley 2 also fluctuates accordingly. The rotation speed fluctuation of the primary pulley 2 tends to increase toward the lowermost speed position, so that slip is more likely to occur toward the lowermost speed position. In view of the foregoing, the second primary pressure actual lower limit higher than the theoretical lower limit is set.

At Step S46, the process determines whether or not the vehicle speed gets less than a predetermined value indicating a vehicle stop. When determining that the vehicle is stopped, the process proceeds to Step S42 for shifting to the control for the condition that the ABS is inactive. When determining that the vehicle is running, the process proceeds to Step S47. At Step S47, the process calculates the primary pressure actual lower limit by multiplying a reference primary pressure actual lower limit Ppmin by the deceleration gain kg and the transmission ratio gain kr.

<Primary Pressure Control when ABS is Inactive> In FIG. 6, during a period from a time instant t1 to a time instant t2, the actual secondary pressure is increased to the corrected required secondary pressure, because an oil quantity balance is not actually short. Thereby, although replacement of the primary pressure theoretical lower limit with the primary pressure actual lower limit allows the target primary pressure to be reduced to the primary pressure actual lower limit, the actual secondary pressure is increased until the oil balance becomes actually short, in order to suppress the occurrence of belt slipping which may be caused by reduction of the primary pressure, wherein the primary pressure Ppri is calculated from the secondary pressure Psec so as to obtain the required differential thrust.

After time instant t2, the oil quantity balance gets short actually, so that the actual secondary pressure Psec does not rise to the corrected required secondary pressure. However, the target primary pressure obtained by subtracting the required differential thrust from the actual secondary pressure Psec is higher than the primary pressure actual lower limit, so that the primary pressure Ppri can be lowered to the target primary pressure.

In this way, according to the control of Steps S3 to S8, by lowering the lower limit of the primary pressure, the secondary pressure during the low speed position return shift can be relatively lowered (or it becomes possible to obtain the differential thrust required for shifting without producing the secondary pressure sufficiently). This allows the oil pump to be downsized, thereby improving the fuel efficiency.

Furthermore, according to the control of Steps S3 to S8, the calculation of the target primary pressure based on the actual secondary pressure Psec makes it possible to ensure the required differential thrust without lowering the primary pressure in the region where the actual secondary pressure Psec can be increased as much as possible, and also makes it possible to ensure the required differential thrust by lowering the primary pressure to the lower limit even in situations where the oil quantity balance gets short actually and the actual secondary pressure Psec does not rise to the corrected required secondary pressure (time instant t2 to a time instant t3 in FIG. 6), thereby allowing the transmission ratio of the CVT 1 to be quickly returned to the lowermost speed position.

On the other hand, when determining at Step S2 that it is immediately before the vehicle is stopped or it is in the transmission steady-state condition where the transmission ratio does not change, the transmission controller 12 proceeds to Step S9, where the transmission controller 12 controls the primary pressure to the primary pressure theoretical lower limit, and controls the secondary pressure to the required secondary pressure, by causing the target primary pressure to approach the primary pressure theoretical lower limit at a predetermined ramp gradient, and causing the corrected required secondary pressure to approach the required secondary pressure at a predetermined ramp gradient. Although the relative slip between the belt and the pulley is suppressed under the dynamic friction coefficient between the belt and the pulley even if the lower limit of the primary pressure is lowered during a transient phase of transmission shifting where the transmission ratio changes, the shifting of the friction coefficient between the belt and the pulley from the dynamic friction coefficient to the static friction coefficient of may cause a relative slip between the pulley and the belt immediately before the vehicle is stopped or when in the transmission steady-state condition where the transmission ratio does not change (in the lowermost speed position). However, the above control serves to improve the low speed position return performance, while preventing the belt 4 from being caused to slip by lowering the lower limit of the primary pressure below the theoretical value in that region. This corresponds to a period from time instant t3 to a time instant t4 in FIG. 6.

Figure 7:
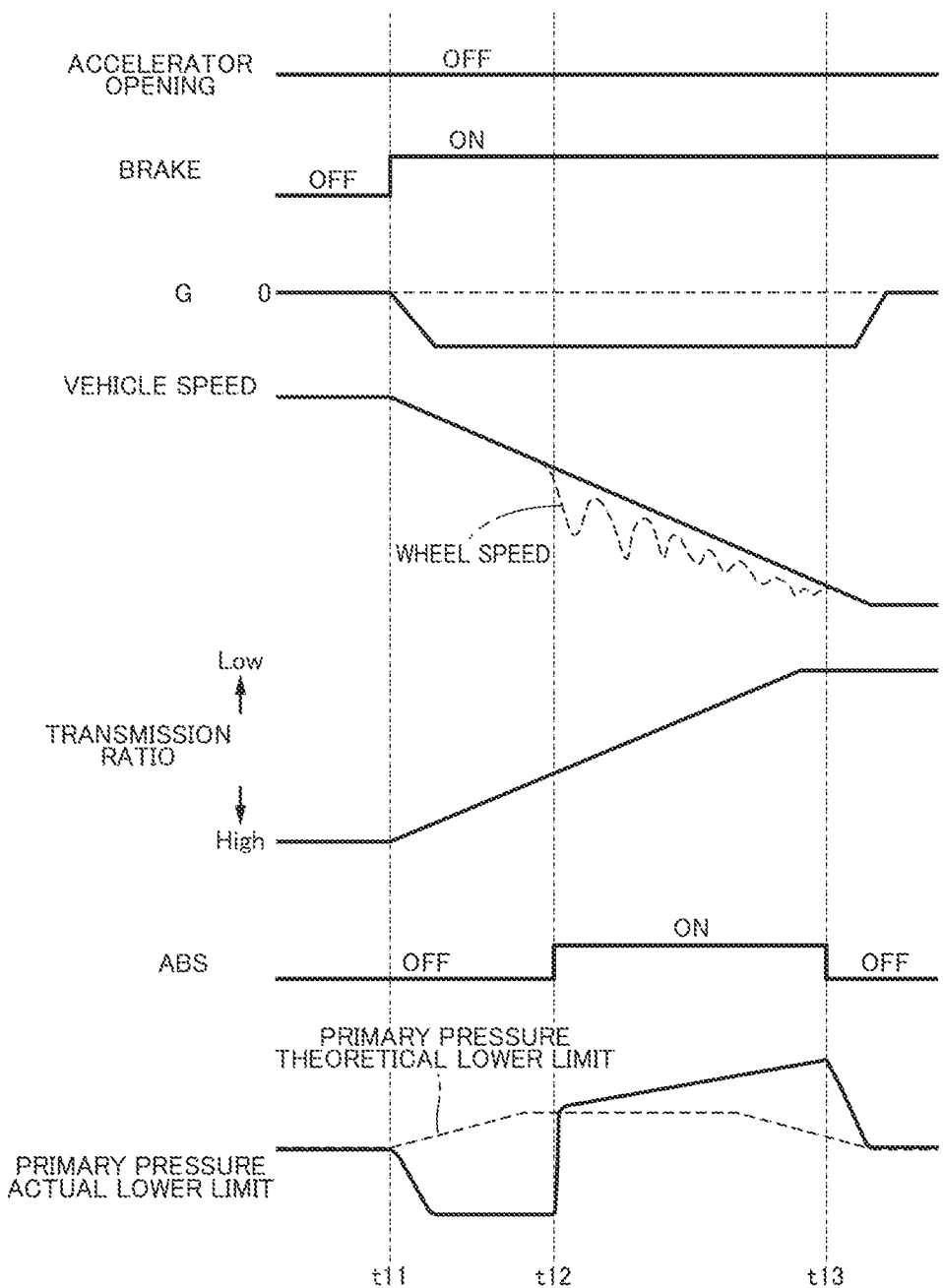
FIG. 7 is a time chart showing behavior when an ABS is activated under the hydraulic pressure reduction control during the low speed position return shift according to the first embodiment.

<Primary Pressure Control when ABS is Active> FIG. 7 is a time chart showing behavior when the ABS is activated under the hydraulic pressure reduction control during the low speed position return shift. The behavior from a time instant t11 to a time instant t12 is the same as that from time instant t1 to time instant t2 in FIG. 6. Hence, description thereof is omitted.

At time instant t12, when a wheel shows a locking tendency and the wheel speed begins to drop significantly with respect to the vehicle speed, the ABS is activated. When the wheel starts to show a locking tendency and the torque acting between the primary pulley 2 and the belt 4 becomes very large, the belt may slip if the primary pressure actual lower limit has been lowered. This is not because the deceleration of the vehicle is large, but because the wheel has a locking tendency and the rotation speed drops sharply.

In addition, according to diligent studies by the inventor(s), it has been found that belt slipping cannot be sufficiently suppressed by simply returning the primary pressure actual lower limit to the primary pressure theoretical lower limit. Therefore, in the first embodiment, the primary pressure actual lower limit is set higher than the primary pressure theoretical lower limit. Furthermore, since the primary pulley 2 gets more susceptible to rotation fluctuation of the secondary pulley side and belt slipping gets more likely to occur as the transmission ratio gets closer to the lowermost speed position, the primary pressure actual lower limit is set to increase as the transmission ratio varies toward the lowermost speed position. Thereby, when the ABS is active during the period from time instant t12 to a time instant t13, belt slipping can be suppressed by setting the primary pressure lower limit high.

At time instant t13, the vehicle speed gets less than the predetermined vehicle speed indicating vehicle stopping, the ramp control is performed for shifting from the primary pressure actual lower limit when the ABS is active to the primary pressure actual lower limit when the ABS is inactive.

As described above, the first embodiment produces actions and effects as listed below.

<1> A belt-type continuously variable transmission includes: a primary pulley 2 to which a primary pressure is supplied; a secondary pulley 3 to which a secondary pressure is supplied; a belt 4 wound around the primary pulley 2 and the secondary pulley 3, wherein a pulley pressing force is determined by the primary pressure and the secondary pressure; and a transmission controller 12 (transmission shift controller) configured to perform a process, when performing a low speed position return shift to shift a transmission ratio of the belt-type continuously variable transmission toward a lowermost speed position while a vehicle is decelerating, wherein the process includes: calculating a primary pressure actual lower limit, at which the belt 4 actually starts to slip, based on the transmission ratio and a deceleration of the vehicle; setting a lower limit of a setpoint of the primary pressure (Ppri) to the primary pressure actual lower limit; and setting the primary pressure actual lower limit higher with a locking tendency of a vehicle wheel detected than that without the locking tendency detected. This feature serves to suppress belt slipping even when a tire shows a locking tendency, because the lower limit of the setpoint of the primary pressure during the low speed position return shift is set to the second primary pressure actual lower limit.

<2> The second primary pressure actual lower limit is set to increase as the transmission ratio varies toward the lowermost speed position. This feature serves to suppress belt slipping even when the lock tendency occurs to cause significant rotational fluctuations.

<3> The second primary pressure actual lower limit is set constant with respect to the deceleration. In other words, the second primary pressure actual lower limit is set regardless of the deceleration. This feature serves to set the suitable second primary pressure actual lower limit even when the deceleration at the time of occurrence of the locking tendency varies depending on the road surface friction coefficient.

<4> The second primary pressure actual lower limit is set higher than a primary pressure theoretical lower limit that is a lower limit of the primary pressure calculated based on a transmitted torque T, a sheave angle θ of the primary pulley 2, a friction coefficient μ between the primary pulley 2 and the belt 4, and a radius R of contact between the primary pulley 2 and the belt 4. This feature serves to suppress belt slipping by setting the second primary pressure actual lower limit higher than the primary pressure theoretical lower limit, when belt slipping may occur even if the primary pressure actual lower limit without the locking tendency of the vehicle wheel detected is simply cancelled for setting to the primary pressure theoretical lower limit.

<5> The primary pressure actual lower limit when an ABS is inactive is set to decrease as the deceleration of the vehicle increases, and decrease as the transmission ratio varies toward the lowermost speed position. The setting of the primary pressure actual lower limit to be low when the deceleration is large serves to easily ensure the differential pressure between the primary pressure and the secondary pressure, ensure the required differential thrust, and thereby complete the transmission shifting quickly, even when the oil quantity balance is short. In addition, when the transmission ratio is closer to the lowermost speed position, the required primary pressure is low, so that the required secondary pressure can be reduced by lowering the primary pressure actual lower limit. This allows the oil pump to be downsized, thereby improving the fuel efficiency. In other words, when the ABS is inactive, the primary pressure actual lower limit is set to decrease as the transmission ratio varies toward the lowermost speed position, and when the ABS is active, the primary pressure actual lower limit is set to increase as the transmission ratio varies toward the lowermost speed position, thereby improving the fuel efficiency and suppressing belt slipping.

The present application is a 371 Application of PCT/JP2019/030853, filed Aug. 6, 2019, which claims priority to Japanese Patent Application No. 2018-176826 filed with the Japan Patent Office on Sep. 21, 2018, all of the contents of each of which are hereby incorporated by reference.

The invention claimed is:

1. A belt-type continuously variable transmission comprising:
   a primary pulley to which a primary pressure is supplied;
   a secondary pulley to which a secondary pressure is supplied;
   a belt wound around the primary pulley and the secondary pulley, wherein a pulley pressing force is determined by the primary pressure and the secondary pressure; and
   a transmission shift controller configured to perform a process, when performing a low speed position return shift to shift a transmission ratio of the belt-type continuously variable transmission toward a lowermost speed position while a vehicle is decelerating, wherein the process includes:
      calculating a primary pressure actual lower limit, at which the belt actually starts to slip, based on the transmission ratio and a deceleration of the vehicle;
      setting a lower limit of a setpoint of the primary pressure to the primary pressure actual lower limit;
      setting the primary pressure actual lower limit higher with a locking tendency of a vehicle wheel detected than that without the locking tendency detected; and
      setting the primary pressure actual lower limit with the locking tendency detected to increase as the transmission ratio varies toward the lowermost speed position.

2. The belt-type continuously variable transmission as claimed in claim 1, wherein the primary pressure actual lower limit with the locking tendency detected is set constant with respect to the deceleration.

3. The belt-type continuously variable transmission as claimed in claim 2, wherein the primary pressure actual lower limit with the locking tendency detected is set higher than a primary pressure theoretical lower limit that is a lower limit of the primary pressure calculated based on a transmitted torque, a sheave angle of the primary pulley, a friction coefficient between the primary pulley and the belt, and a radius of contact between the primary pulley and the belt.

4. The belt-type continuously variable transmission as claimed in claim 3, wherein the primary pressure actual lower limit without the locking tendency detected is set to decrease as the deceleration of the vehicle increases, and decrease as the transmission ratio varies toward the lowermost speed position.

5. The belt-type continuously variable transmission as claimed in claim 2, wherein the primary pressure actual lower limit without the locking tendency detected is set to decrease as the deceleration of the vehicle increases, and decrease as the transmission ratio varies toward the lowermost speed position.

6. The belt-type continuously variable transmission as claimed in claim 1, wherein the primary pressure actual lower limit with the locking tendency detected is set higher than a primary pressure theoretical lower limit that is a lower limit of the primary pressure calculated based on a transmitted torque, a sheave angle of the primary pulley, a friction coefficient between the primary pulley and the belt, and a radius of contact between the primary pulley and the belt.

7. The belt-type continuously variable transmission as claimed in claim 1, wherein the primary pressure actual lower limit without the locking tendency detected is set to decrease as the deceleration of the vehicle increases, and decrease as the transmission ratio varies toward the lowermost speed position.

8. A method for a belt-type continuously variable transmission,
   the belt-type continuously variable transmission comprising:
      a primary pulley to which a primary pressure is supplied;
      a secondary pulley to which a secondary pressure is supplied; and
      a belt wound around the primary pulley and the secondary pulley, wherein a pulley pressing force is determined by the primary pressure and the secondary pressure;
   the method comprising:
   performing a process by a transmission shift controller, when performing a low speed position return shift to shift a transmission ratio of the belt-type continuously variable transmission toward a lowermost speed position while a vehicle is decelerating, wherein the process includes:
      calculating a primary pressure actual lower limit, at which the belt actually starts to slip, based on the transmission ratio and a deceleration of the vehicle;
      setting a lower limit of a setpoint of the primary pressure to the primary pressure actual lower limit;
      setting the primary pressure actual lower limit higher with a locking tendency of a vehicle wheel detected than that without the locking tendency detected; and setting the primary pressure actual lower limit with the locking tendency detected to increase as the transmission ratio varies toward the lowermost speed position.

* * * * *